US008584126B2

United States Patent
Ang et al.

(10) Patent No.: US 8,584,126 B2
(45) Date of Patent: Nov. 12, 2013

(54) SYSTEMS AND METHODS FOR ENABLING THREADS TO LOCK A STAGE PRIOR TO PROCESSING DATA

(75) Inventors: Boon Seong Ang, Sunnyvale, CA (US); Andrew Lambeth, San Mateo, CA (US); Jyothir Ramanan, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 1218 days.

(21) Appl. No.: 12/050,861

(22) Filed: Mar. 18, 2008

(65) Prior Publication Data

US 2008/0235690 A1 Sep. 25, 2008

Related U.S. Application Data

(60) Provisional application No. 60/896,593, filed on Mar. 23, 2007.

(51) Int. Cl.
*G06F 9/46* (2006.01)
(52) U.S. Cl.
USPC ......................................................... 718/102

(58) Field of Classification Search
USPC .............................................................. 718/102
See application file for complete search history.

(56) References Cited

U.S. PATENT DOCUMENTS

| | | | | |
|---|---|---|---|---|
| 6,167,424 | A * | 12/2000 | Bak et al. | 718/100 |
| 6,418,478 | B1 * | 7/2002 | Ignatius et al. | 709/240 |
| 6,687,904 | B1 * | 2/2004 | Gomes et al. | 718/102 |
| 2002/0078119 | A1 * | 6/2002 | Brenner et al. | 709/102 |
| 2004/0088573 | A1 * | 5/2004 | Jeyaram | 713/201 |
| 2005/0132363 | A1 * | 6/2005 | Tewari et al. | 718/1 |
| 2005/0283783 | A1 * | 12/2005 | DeSota | 718/100 |
| 2006/0015700 | A1 * | 1/2006 | Burka | 711/163 |
| 2006/0093044 | A1 * | 5/2006 | Grantham et al. | 375/240.28 |
| 2007/0162723 | A1 * | 7/2007 | Ali | 712/205 |
| 2007/0214457 | A1 * | 9/2007 | Goyal et al. | 718/101 |
| 2008/0168479 | A1 * | 7/2008 | Purtell et al. | 719/328 |

* cited by examiner

*Primary Examiner* — Jacob A Petranek

(57) ABSTRACT

A system and method for maintaining processing order while permitting parallelism. Processing of a piece of work is divided into a plurality of stages. At each stage, a task advancing the work towards completion is performed. By performing processing as a sequence of tasks, processing can be done in parallel, with progress being made simultaneously on different pieces of work in different stages by a plurality of threads of execution.

49 Claims, 9 Drawing Sheets

SYSTEMS AND METHODS FOR ENABLING THREADS TO LOCK A STAGE PRIOR TO PROCESSING DATA

This application claims the benefit of U.S. Provisional Application No. 60/896,593, filed Mar. 23, 2007, which provisional application is incorporated herein by reference in its entirety.

FIELD OF THE INVENTION

One or more embodiments of the present invention relate to organization of work in a computer system, and specifically to organization of work for parallel processing.

BACKGROUND

Many software/firmware-based systems support multiple concurrent threads of execution. Doing so has a potential to increase concurrency and hence throughput. This approach has to be used with care when relative ordering of work done by different threads is important. The risk of race conditions is a well-known problem, and synchronization methods are needed to prevent undesired relative ordering of events. While simple synchronization schemes are relatively straightforward, they constrain parallelism.

One way to get around a limitation of using a single lock, and hence completely disabling parallelism, is to adopt pipelining. Pipelining is most commonly done in hardware, where each subpart of a piece of hardware does a different thing, and data to be processed is moved from one pipeline stage to another, much like on an assembly line. A software system can mimic this by have a software thread implement the function of each pipeline stage run on its own CPU. Work passing from one pipeline stage to another is passed from one software thread to another, and possibly through queues to accommodate potentially different rates of processing in each pipeline stage. This is sometimes done in embedded systems, employing firmware running on a multiple processor design. However, this approach has a number of limitations. First, when functionality is implemented by software and there are more pipeline stages than the number of processors (i.e. the number of threads that can be executing), the model breaks down and has to be modified by merging pipeline stages. In addition, when different pipeline stages take different amounts of time, processing efficiency suffers. Some processors will be underutilized. Further, unbalanced pipeline stages degrading performance is a problem for pipeline hardware. In general, hardware designers try hard to make sure each pipeline stage takes a similar amount of time. However, this is only possible because each hardware pipeline stage is typically very simple, and has little dynamic variability. Software-implemented functions generally have high dynamic variability. Furthermore, when code performing different tasks has to time-multiplex and share a more limited number of processors, it becomes impractical, if not impossible, to balance pipeline stages. At the very least, it becomes a complex scheduling problem. Another disadvantage of such a prior art solution—software implementing a strict pipeline model—is that handing work between software threads running on different processors as the work proceeds through the pipeline is inefficient. It engenders coordination and synchronization overhead, and quite possibly a fair amount of state transfer between CPUs running the threads.

SUMMARY OF THE INVENTION

One or more embodiments of the present invention are system and method for carrying out complex functions in multi-threaded software that executes in dynamically formed, intersecting virtual pipelines, which system and method maintains processing order while permitting parallelism. In accordance with one or more such embodiments, processing a piece of work is divided into a plurality of stages. At each stage, a task advancing the work towards completion is performed. By performing processing as a sequence of tasks, processing can be done in parallel, with progress being made simultaneously on different pieces of work in different stages by a plurality of threads of execution. In accordance with one or more such embodiments, each stage is associated with a queue and a lock. A thread of execution takes the lock associated with a stage before beginning that stage's task. If the lock is not available, the thread of execution atomically stores the work in the queue associated with the task. After the lock becomes available, the work can be removed from the queue, and the task associated with the stage can be performed. The work can be taken from the queue by the same thread of execution that stored the work in the queue, or it can be taken from the queue by a different thread of execution. In accordance with one or more such embodiments, a thread of execution entering a stage after successfully obtaining the state's associated lock checks the associated queue for queued pieces of work. If any queued pieces of work are found, the thread processes them through the stage before processing any piece of work brought in by the thread itself.

DETAILED DESCRIPTION

Figure 1:
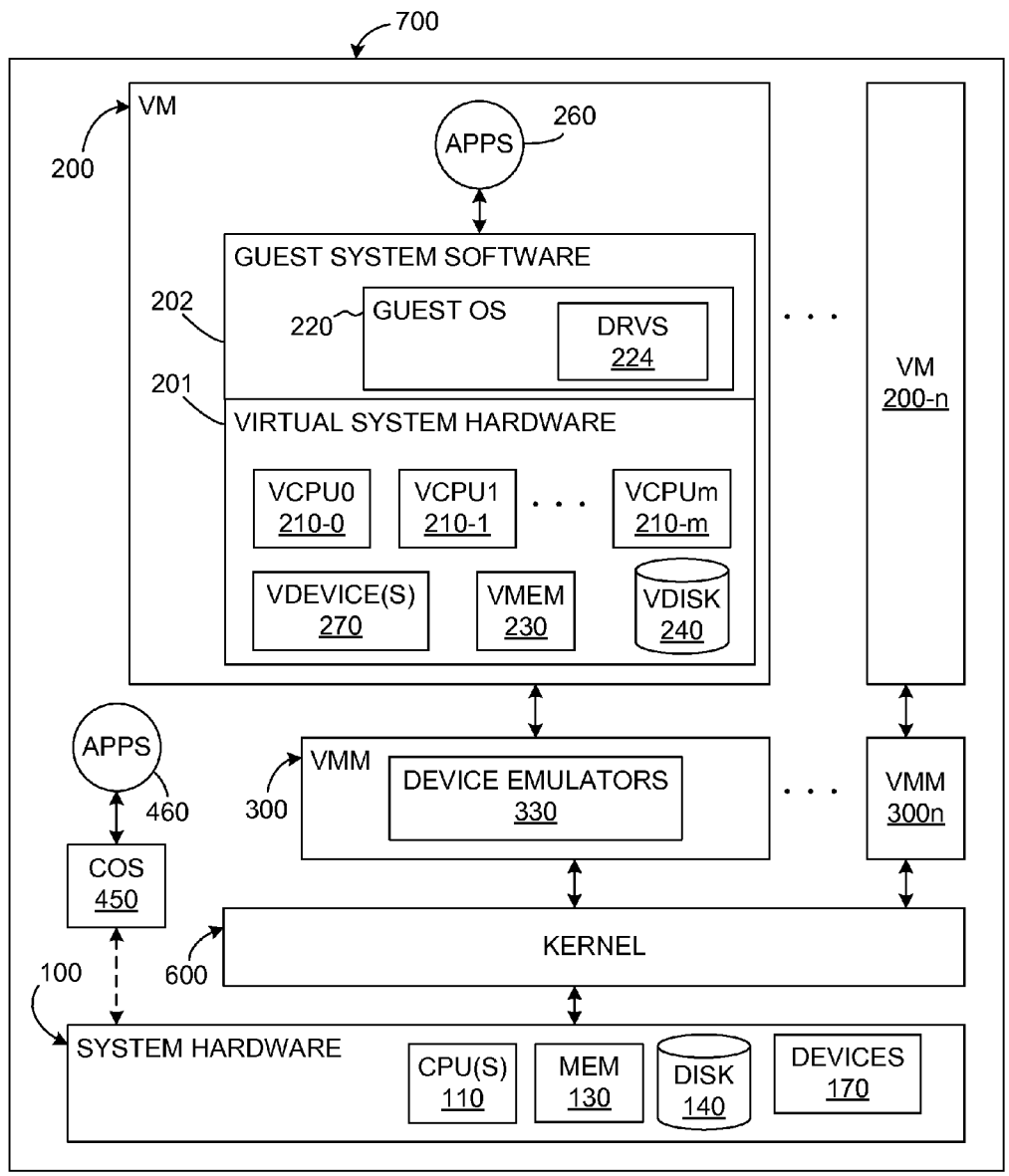
FIG. 1 shows a virtualized computer system in which one or more embodiments of the present invention may operate.

One or more embodiments of the present invention are system and method for carrying out complex functions in multi-threaded software that executes in dynamically formed, intersecting virtual pipelines, which system and method maintains processing order while permitting parallelism. In particular, one or more embodiments of the present invention, are system and method for synchronizing and organizing work (i.e. partitioning work among different threads of execution) to maintain a predetermined desired ordering, while enabling concurrency between multiple threads of execution. As a result, the system and method enable low latency, efficient use of CPU threads; allowing concurrency when it is safe to do so, while ensuring in-order processing. In accordance with one or more such embodiments, processing a piece of work is divided into a plurality of stages. A plurality of threads of execution can execute the tasks of various stages simultaneously, permitting parallel processing. A system of queues and locks associated with each stage maintains processing order, allowing (in a linear chain of stages) a first piece of work, beginning processing before a second piece of work, to be completed before the second piece of work.

In accordance with one or more embodiments of the present invention, various tasks are performed simultaneously by a plurality of threads of execution using a method for preserving work order. In accordance with one or more such embodiments, a thread of execution can be implemented as a thread, a process, or a multipurpose or specialized processor. For example, a first thread of execution could be implemented as a thread executing on a first processor of a multi-core processor, and a second thread of execution could be implemented as a thread executing on a second processor of the multi-core processor. In accordance with one or more further such embodiments, a first thread of execution could be implemented as a thread executing on a first processor of a symmetric multiprocessor system, and a second thread of execution could be implemented as a thread executing on a second processor of the symmetric multiprocessor system. In accordance with one or more still further such embodiments, a first thread of execution could be implemented as a thread executing on a processor and a second thread of execution could be implemented as a different thread executing on the same processor. These embodiments have been given for the purposes of illustration and are not limiting. Other embodiments of threads of execution will be apparent to one of skill in the art without departing from the scope of the present invention.

In accordance with one or more embodiments, a method for maintaining processing order while permitting parallelism can be used to perform any kind of computer processing. For example, tasks of various stages can serve processing purposes such as, for example and without limitation, creating graphics, rendering animation, encoding/decoding data, mapping genome sequences, responding to requests received over a network, compiling source code, performing digital signal processing algorithms, and so on. These examples have been provided for the purposes of illustration and are not limiting. Examples of other processing purposes for which it may be desired to maintain processing order while permitting parallelism will be apparent to one of skill in the art without departing from the scope of the present invention.

One or more embodiments of the present invention can be carried out in either virtualized or non-virtualized computer systems. The Appendix describes hosted and non-hosted implementations of virtualized computer systems, and one or more embodiments of the present invention may be carried out using one or both such implementations of virtualized computer systems, as well as para-virtualized computer systems.

One or more embodiments of the present invention are described as being applicable in a virtualized computer system having a virtual switch. In particular, FIG. 3 shows computer system 1700 which utilizes a method of packet switching in a virtual switch in accordance with one or more embodiments of the present invention wherein the virtual switch can employ multiprocessing resources of computer system 1700 while maintaining the order of packets for a particular source-destination pair.

Figure 2:
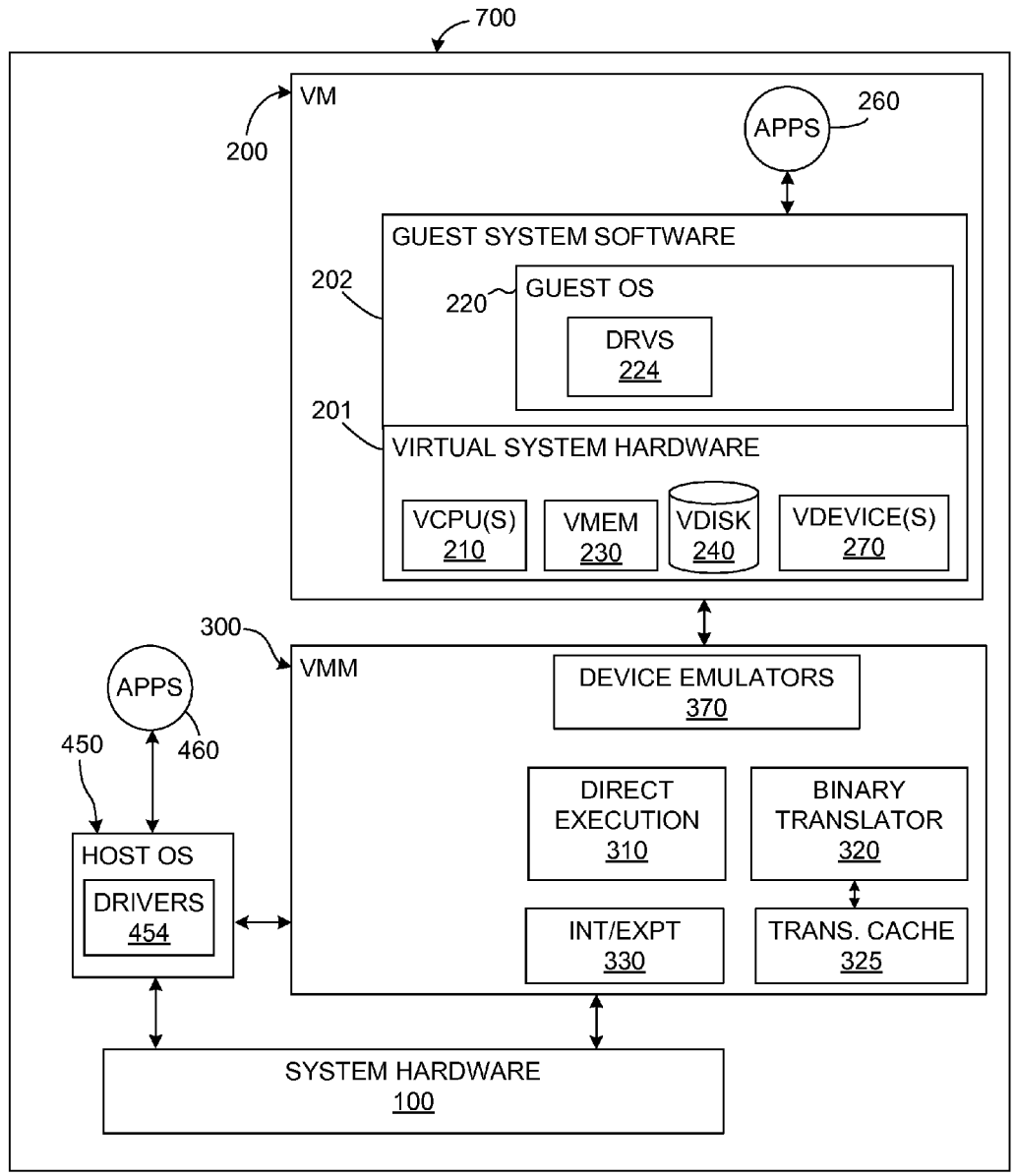
FIG. 2 shows another virtualized computer system in which one or more embodiments of the present invention may operate.
Figure 3:
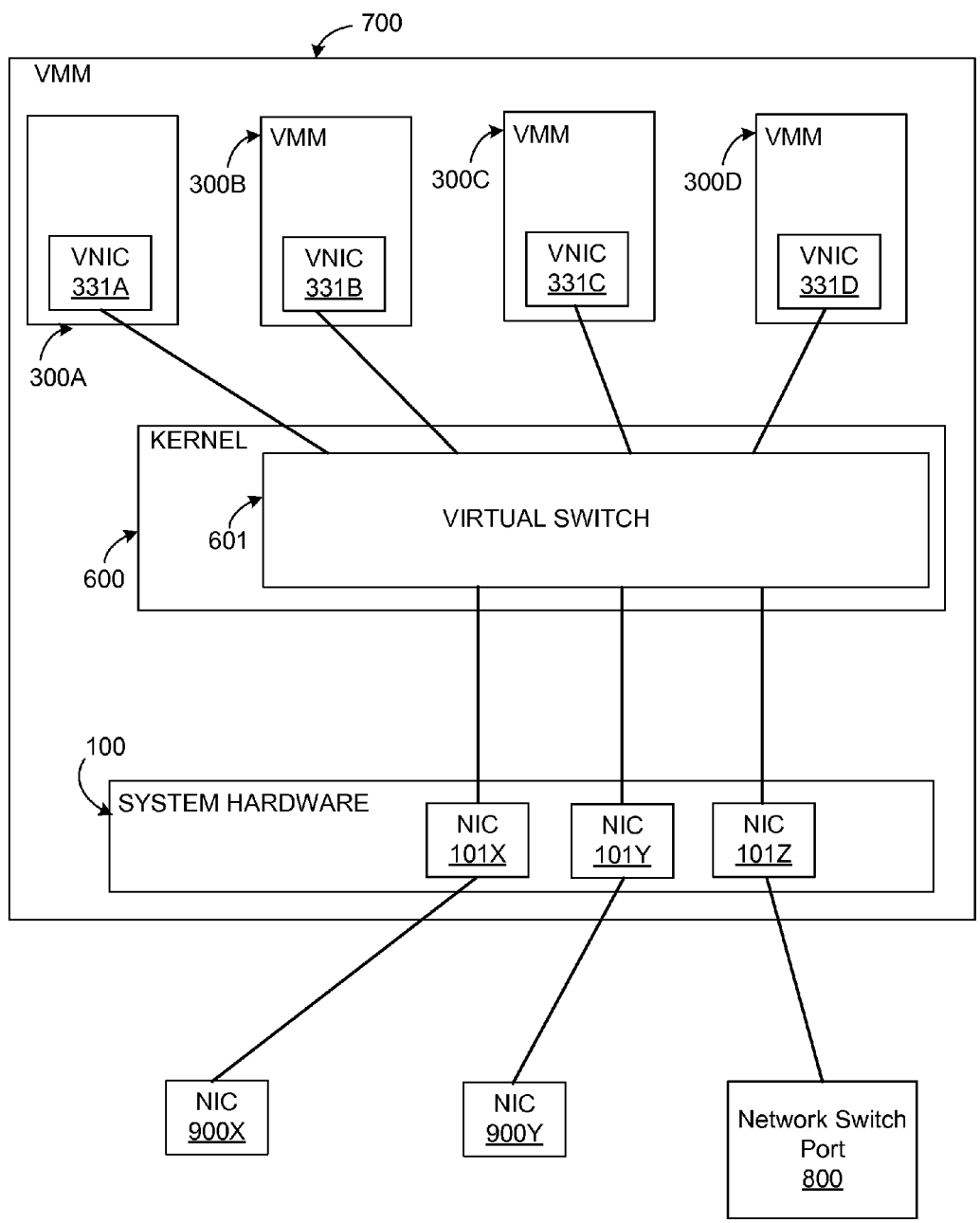
FIG. 3 shows a virtualized computer system that implements a virtual switch in accordance with one or more embodiments of the present invention.

FIG. 3 shows a plurality of virtual machine monitors (i.e., VMM 300A-VMM 300D), which VMMs operate in conjunction with a plurality of virtual machines (VMs) (the VMs are not shown in FIG. 3). Each of VMMs 300A-300D contains at least one virtual network interface controller (VNIC), for example VNICs 331A-331D of VMMs 300A-300D, respectively (in FIG. 3, VNICs 331A-331D are shown as being associated with VMMs 300A-300D, respectively, for ease of illustration since, as indicated by FIG. 2 VNIC(s) for a VM may be emulated by device emulators 370 in a VMM associated with the VM). A network interface card is one form of a network interface controller, but sometimes, the terms are used interchangeably. Each of VNICs 331A-331D emulates (in software) the functionality of a physical network interface card. It should be understood that each of VMMs 300A-300D can operate in conjunction with a plurality of VNICs, and that computer system 1700 can also contain additional VMMs that do not operate in conjunction with VNICs.

As further shown in FIG. 3, system hardware 100 can contain one or more network interface controllers (i.e., NICs 101X-101Z), also commonly referred to as "network interfaces." Each of NICs 101X-101Z may be any device allowing communication on a network. According to one or more embodiments of the present invention, each of NICs 101X-101Z is a physical network interface controller. For example, one or more of NICs 101X-101Z could be implemented as an Ethernet device, an 802.11 wireless device, or as a device using a different technology. Other implementations of network interfaces will be apparent to one of ordinary skill in the art without departing from the scope of the present invention.

One or more of NICs 101X-101Z can be connected to network switch ports (for example, network switch port 800) or other NICs (for example, NIC 900X and/or NIC 900Y). As shown in FIG. 3, network switch port 800 and NICs 900X-900Y are external to computer system 1700, and facilitate connections to other devices on a network (not shown). Furthermore, any number of connections and relays (not shown) may exist between NICs 101X-101Y and NICs 900X-900Y. Typically, network switch port 800 and NICs 900X-900Y are contained in another physical or virtual switch, or are contained in a group of physical or virtual switches.

The number of VNICs 331A-331D, NICs 101X-101Z, network switch port 800 and NICs 900X-900Y shown in FIG. 3 has been selected for purposes of illustration and is not limiting. Further, the number of each of VNICs 331A-331D, NICs 101X-101Z, network switch port 800 and NICs 900X-900Y may be different from each other. For example, the number of VNICs 331A-331D commonly exceeds the number of NICs 101X-101Z.

As further shown in FIG. 3, kernel 600 (referring to the Appendix, kernel 600 is a part of a virtualization layer) contains virtual switch 601 that manages connections among VNICs 331A-331D and between VNICs 331A-331D and NICs 101X-101Z.

In accordance with one or more embodiments, virtual switch 601 carries out packet processing on packets received from VNICs 331A-331D. In particular, virtual switch 601 (implemented in software) performs a series of tasks to process the incoming packets. For example, such tasks could include checking an incoming packet for errors, identifying a destination address for the packet, determining a (physical or virtual) switch port on which the packet should be transmitted—based, for example, on destination address, fragmenting the packet (if appropriate), forming the packet for transmission, transmitting the packet on the identified port, and/or delivering the packet to a VNIC. Additional advanced tasks can include packet filtering, or rewriting packet headers or payload. As such, virtual switch 601 transmits the packets to one of VNICs 331A-331D or to one of NICs 101X-101Z. Virtual switch 601 can also perform similar processing on packets received from one of NICs 101X-101Z.

While virtual switch 601 has been shown for the purposes of illustration as being implemented in a kernel of a non-hosted virtual machine, virtual switches could also be implemented in other components of virtualization software, such as those in hosted virtual machines. These examples are given for the purposes of illustration and are not limiting. Other embodiments of the virtual switch described herein will be apparent to one of skill in the art without departing in scope from the present invention.

The following describes the problem faced in the example described above in conjunction with FIG. 3 where networking data, generally in the form of packets, can flow between VMs whose virtual NICs are connected to the same virtual switch (as shown in FIG. 3, VNICs 331A-331D are shown as being associated with VMMs 300A-300D, respectively, for ease of illustration since, as indicated by FIG. 2 VNIC(s) for a VM may be emulated by device emulators 370 in a VMM associated with the VM). As described above, networking data can also flow between a VM's virtual NIC, through a virtual switch, and through a physical NIC to the outside world. Networking data can also flow in the reverse direction from the physical NIC, through the virtual switch, and into a virtual NIC to a destination VM. Software implementing a virtualization networking subsystem placed, for example, in kernel 600, employs multiple threads to perform the work. For example, each thread may proceed independently and concurrently on a separate CPU of an SMP system unless constrained. In the absence of any constraint on this concurrency, it is possible for packets sent between a pair of source and destination virtual NICs to be delivered out-of-order. To understand the problem, consider a system having two uniprocessor (UP) VMs (VM-1 and VM-2) wherein each VM has a virtual NIC, i.e., VNIC-1 and VNIC-2, respectively, connected to virtual switch 601. In addition, assume that system hardware 100 is a 4-way (i.e. 4 CPU) SMP machine, and that VM-1 is sending a lot of data to VM-2. Further assume that two (2) networking threads, T1 and T2, are running code implementing the virtualization networking subsystem.

Given the above, each thread picks packets ready for transmission from VNIC-1, sends them through virtual switch 601, and delivers them into VNIC-2, where they are picked up by VM-2. Because system hardware 100 has four (4) physical processors (PCPUs), VM-1 and VM-2 (each requires only one physical CPU) can be running at the same time as networking threads T1 and T2. As such, concurrency between networking threads T1 and T2 has to be coordinated. This includes picking a packet from VNIC-1 so that only one thread, T1 or T2, but not both, picks the packet up and processes it. Using well known methods, this can be achieved, for example, by using a synchronization lock associated with a transmit part of VNIC-1 so that whenever networking thread T1 or T2 picks a packet from VNIC-1, it needs first to acquire the lock. Then, the networking thread relinquishes the lock after the packet has been taken from VNIC-1. Similarly, coordination is needed at a destination when the packet is delivered into a receive part of VNIC-2. Again this may be achieved using well known methods. Note that locking is not needed in the virtual switch except when its switching table is changed, an infrequent event. The coordination method described above is problematic in that packets picked up from a single FIFO queue at VNIC-1 can end up out of order at VNIC-2, assuming that multiple packets are heading to VNIC-2. This is because, once packets are picked up separately by networking threads T1 and T2, the two networking threads can run at different relative speeds. As such, there is no knowing which one will get to VNIC-2 first and acquire its lock. So, for example, if networking thread T1 picks up packet-1 first, and then networking thread T2 picks up packet-2, networking thread T2 may end up acquiring VNIC-2's lock before networking thread T1 does, and end up depositing packet-2 at VNIC-2 before packet-1 is deposited. In particular, if networking thread T1 picks up a number of packets, some of which have destinations other than VNIC-2, it may be spending time delivering those packets before getting to packet-1. In the mean time, VM-1 may produce more packets, including packet-2, which is then picked up by networking thread T2. If networking thread T2 does not have other packets to deliver, it is quite possible that networking thread T2 will get to VNIC-2 before networking thread T1 does. One solution would be to not release VNIC-1's lock until all its packets have been delivered to its destination, not just picked up. However, that means only one networking thread can be performing networking tasks on behalf of a VNIC at any one time, thus limiting performance.

The following describes one or embodiments of the present invention that address the issues described above. In particular, FIG. 4(*a*) shows a linear chain of processing stages that are fabricated in accordance with one or more embodiments of the present invention. As shown in FIG. 4(*a*), in accordance with one or more embodiments of the present invention, processing is divided into a plurality of processing stages 404, 408, and 412. The chain of processing stages shown in FIG. 4(*a*) is described as being a linear chain because each processing stage is entered from at most one previous processing stage, and leads to at most one subsequent processing stage. For example, processing stage 404 leads to processing stage 408, and no other processing stage leads to processing stage 408. Similarly, processing stage 408 leads to processing stage 412, and no other processing stage leads to processing stage 412. The chain of processing stages can also include other processing stages not illustrated. For example, the processing stages shown could be a linear segment of a larger non-linear processing stage topology.

In accordance with one or more embodiments of the present invention, each processing stage has a task associated with it. For example, in a case related to processing packets described above, processing stage 404 could be associated with a task of copying a packet from an input buffer, processing stage 408 could be associated with a task of decoding a packet to identify a destination of the packet, and processing stage 412 could be associated with a task of copying a packet into a destination buffer. Other examples of tasks that could be associated with a stage will be apparent to one of ordinary skill in the art without departing from the scope of the present invention.

In accordance with one or more embodiments of the present invention, each processing stage is associated with a lock and a queue. In accordance with the embodiment shown in FIG. 4(*a*), processing stage 404 is associated with lock 402 and queue 401, processing stage 408 is associated with lock 406 and queue 405, and processing stage 412 is associated with lock 410 and queue 409.

In accordance with one or more embodiments of the present invention, a lock can be implemented as any known synchronization primitive, such as, for example and without limitation, a spin-lock or a semaphore. In accordance with one or more such embodiments, the lock is implemented as a spinlock, and at most one thread of execution can hold a particular lock at a given point in time. In accordance with one or more embodiments, taking a lock may be attempted on a trial basis, such that a failed attempt to take a lock will avoid stalling a thread of execution. Further, in accordance with one or more such embodiments, the attempt returns with status information indicating whether taking of the lock was successful.

In accordance with one or more embodiments of the present invention, a queue can be implemented as any data structure capable of storing work. In accordance with one or more such embodiments, a queue is implemented as a first-in first-out (FIFO) structure, such that a first piece of work stored in the queue before a second piece of work will be taken from the queue before the second piece of work. In accordance with one or more embodiments, a queue includes a mechanism for ensuring that additions and/or removals to the queue occur atomically. For example and without limitation, a queue may be associated with a lock of its own, and a thread of execution may take the queue lock before storing work in the queue and/or taking work from the queue. After storing work in the queue and/or taking work from the queue, the thread of execution releases the queue lock. In accordance with one or more embodiments, operations for adding or removing entries to the queue are implemented with atomic load or store operations so that atomicity of queue entry addition or removal can be achieved without taking any lock. Various techniques for ensuring that at most a single thread of execution stores or takes work in a particular queue at a given moment in time can be implemented without departing from the scope of the present invention.

In accordance with one or more embodiments of the present invention, a thread of execution begins with one or more pieces of work to do, and it attempts to take the pieces of work through as many processing stages as possible. For example, an unobstructed thread of execution could proceed along the linear chain of processing stages shown in FIG. 4(a) as follows: The thread of execution takes lock 402, performs the task associated with processing stage 404, takes lock 406, releases lock 402, performs the task associated with processing stage 408, takes lock 410, releases lock 406, performs the task associated with processing stage 412, and releases lock 410. Because the thread of execution takes a lock on a subsequent stage before beginning a task associated with the subsequent processing stage, processing order is maintained. A thread of execution following this discipline will be prevented from errantly overtaking another thread of execution in the linear chain of processing stages. Because multiple threads of execution can be performing different tasks in different processing stages at the same time, parallelism is achieved. Furthermore, because the same thread of execution performs tasks associated with a plurality of processing stages, processing order is maintained with low overhead and small latency.

If a thread of execution is not able to enter a processing stage (for example, if a lock associated with a processing stage is unavailable), the thread of execution stores its pieces of work in a queue associated with the unavailable processing stage. In accordance with one or more embodiments, the thread of execution is now free and available for processing other different pieces of work. Storing work in a queue associated with an unavailable processing stage advantageously prevents idle waiting by the thread of execution.

Work stored in a queue can be taken from the queue at a later point in time, either by the same thread of execution that stored the work or by a different thread of execution. For example, based on a timer interrupt or another signal, a "clean-up" thread of execution can traverse the chain of processing stages looking for work to be taken from a queue. If the clean-up thread of execution acquires a lock on a stage with pieces of work stored in its associated queue, the clean-up thread of execution can take one or more pieces of work from the queue, and perform the task associated with the processing stage on the pieces of work, for example as described herein in conjunction with reference to FIG. 6. In accordance with one or more embodiments, whenever a thread of execution reaches the end of the chain of processing stages, the thread of execution returns to a processing stage in the chain and looks for additional pieces of queued-up work to take from the processing stage's associated queue.

In accordance with one or more embodiments, after a thread of execution acquires a lock on a processing stage, the thread of execution first performs the task associated with the processing stage on pieces of work stored in the queue associated with the processing stage before performing the task associated with the processing stage on its own pieces of work, thereby maintaining processing order. A method for performing a task associated with a particular processing stage is described herein in conjunction with reference to FIG. 6.

Figure 4A:
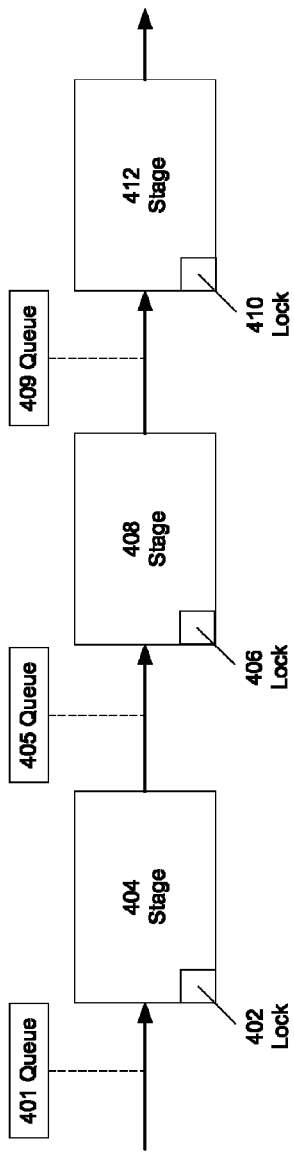
FIG. 4(a) shows a linear chain of processing stages that are fabricated in accordance with one or more embodiments of the present invention.

In the embodiment shown in FIG. 4(a), each processing stage is associated with one lock. However, in accordance one or more further embodiments, a processing stage is associated with a plurality of locks. For example and without limitation, each stage can be associated with an "in" lock and an "out" lock. A thread of execution traversing the chain of processing stages shown in FIG. 4(a), for example, would take the "in" lock of stage 404, perform the task associated with processing stage 404, take the "out" lock of stage 404, release the "in" lock of stage 404, take the "in" lock of processing stage 408, release the "out" lock of stage 404, and so on. A multiple lock per stage implementation is useful in that it allows a second thread of execution to enter a stage before a first thread of execution has left the processing stage.

Figure 4B:
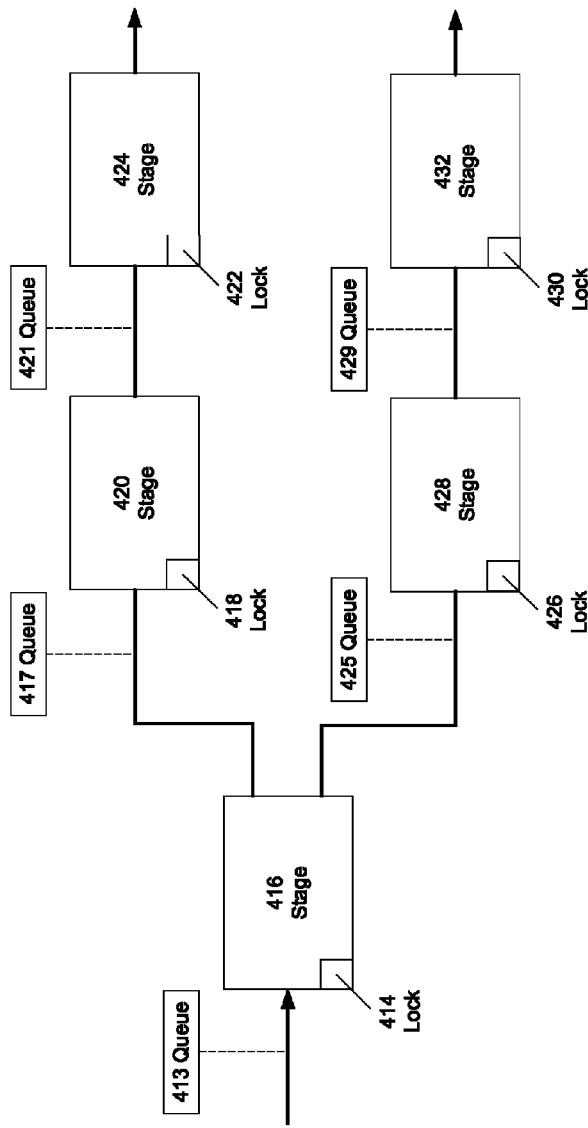
FIG. 4(b) shows a branching chain of processing stages that are fabricated in accordance with one or more embodiments of the present invention.

FIG. 4(b) shows a branching chain of processing stages that are fabricated in accordance with one or more embodiments of the present invention. As shown in FIG. 4(b), in accordance with one or more embodiments of the present invention, processing is divided into a plurality of stages 416, 420, 424, 428, and 432. The chain of processing stages shown in FIG. 4(b) is described as being a branching chain because processing stage 416 can lead to processing stage 420 or to processing stage 428. A branching topology is useful, for example, in cases in which processing for different pieces of work may proceed down different paths. In particular, processing order need not be maintained between pieces of work that proceed down different branches after performance of the task at the last shared processing stage. For example, in the case of processing packets, processing stage 416 could be associated with a task of identifying a destination of a packet, processing stages 420 and 424 could be associated with tasks for delivering a packet to a first destination, and processing stages 428 and 432 could be associated with tasks for delivering a packet to a second destination. In processing packets, efficiency is improved by maintaining the relative order of packets for a particular source/destination pair. However, it may not have an effect on efficiency if packets directed to destination A are delivered before packets to destination B, or vice versa, provided that packets directed to destination A are delivered in their proper order and packets directed to destination B are delivered in their proper order. Thus, a branching topology permits increased parallelism for cases when processing order of particular tasks is flexible.

In accordance with one or more embodiments of the present invention, each processing stage is associated with a lock and a queue. In accordance with the embodiment shown in FIG. 4(b), processing stage 416 is associated with lock 414 and queue 413, processing stage 420 is associated with lock 418 and queue 417, processing stage 424 is associated with lock 422 and queue 421, processing stage 428 is associated with lock 426 and queue 425, and processing stage 432 is associated with lock 430 and queue 429.

As further shown in FIG. 4(b), processing stage 416 leads to both processing stage 420 and processing stage 428. In accordance with one or more embodiments, it is possible for multiple pieces of work to enter processing stage 416 at the same time. The multiple pieces of work can be processed through that processing stage before the thread of execution proceeds to another processing stage. At the completion of the task associated with processing stage 416 for the multiple pieces of work, the next appropriate task for some pieces of work may be the task associated with processing stage 420, and the next appropriate task for some other pieces of work may be the task associated with processing stage 428. Whenever a thread of execution has completed the task associated with processing stage 416, the thread determines which processing stage is associated with an appropriate subsequent task for each piece of work it is processing. If all the pieces of work of a thread of execution are appropriate for a single subsequent task (for example, the task associated with processing stage 420), the thread of execution can proceed towards processing stage 420 as in a linear chain of processing stages, taking lock 418 and performing the task associated with processing stage 420 if lock 418 is available, otherwise storing its work in queue 417.

If some pieces of the work of a thread of execution are appropriate for a first subsequent task (for example the task associated with processing stage 420) and some other pieces of the work of a thread of execution are appropriate for a second subsequent task (for example the task associated with processing stage 428), the thread of execution stores some of the work on a queue associated with one of the subsequent processing stages and attempts to perform a task associated with one of the other subsequent processing stages on some other of the work.

For the purposes of illustration, a two-way branch has been shown in FIG. 4(b). This embodiment has been chosen merely for illustration and is not limiting. According to various embodiments of the present invention, a processing stage can lead to any number of subsequent processing stages. Various methods for maintaining processing order while permitting parallelism can be implemented in any number of complex stage topologies without departing from the scope of the present invention.

Figure 4C:
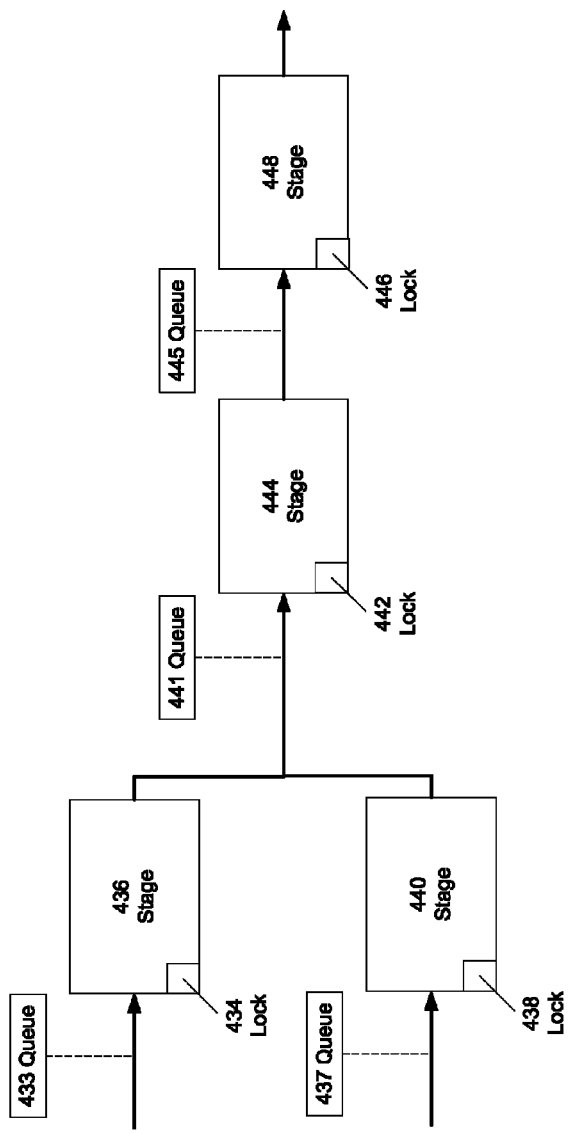
FIG. 4(c) shows a merging chain of processing stages that are fabricated in accordance with one or more embodiments of the present invention.

FIG. 4(c) shows a merging chain of processing stages that are fabricated in accordance with one or more embodiments of the present invention. As shown in FIG. 4(c), in accordance with one or more embodiments of the present invention, processing is divided into a plurality of processing stages 436, 440, 444, and 448. The chain of processing stages shown in FIG. 4(c) is described as being a merging chain because processing stage 436 and processing stage 440 lead to processing stage 444. A merging topology is useful, for example, where it is useful to maintain processing order after performance of a particular task or where maintaining a combined sequence of processing stages may be more resource efficient than maintaining separate sequences of stages. In accordance with the embodiment shown in FIG. 4(c), processing stage 436 and processing stage 440 are associated with tasks that can be performed in any order (with respect to each other), and processing stage 444 is associated with a task which is to be performed at the completion of the tasks associated with stage processing 436 and/or processing stage 440 and before the task associated with processing stage 448.

In accordance with one or more embodiments of the present invention, each processing stage is associated with a lock and a queue. In accordance with the embodiment shown in FIG. 4(c), processing stage 436 is associated with lock 434 and queue 433, processing stage 440 is associated with lock 438 and queue 437, processing stage 444 is associated with lock 442 and queue 441, and processing stage 448 is associated with lock 446 and queue 445.

As shown in FIG. 4(c), both processing stage 436 and processing stage 440 lead to processing stage 444. Whenever a thread of execution has completed the task associated with processing stage 436, the thread of execution attempts to take lock 442. However, a thread of execution that has completed the task associated with processing stage 440 could also be attempting to take lock 442. Therefore, it is preferable that lock 442 be implemented to avoid deadlock if two threads attempt to access lock 442 simultaneously. The contention can be resolved, for example and without limitation, by selecting one of the contending threads of execution, allowing it to take lock 442, and making lock 442 unavailable to the other contending threads of execution. The selected thread of execution performs the task associated with processing stage 444, and the non-selected threads store their work in queue 441 atomically.

For the purposes of illustration, a two-way merge has been shown in FIG. 4(c). This processing has been chosen merely for illustration and is not limiting. According to various embodiments of the present invention, any number of stages can lead to the same subsequent stage. Methods for maintaining processing order while permitting parallelism can be implemented in any number of complex stage topologies without departing from the scope of the present invention.

Figure 5A:
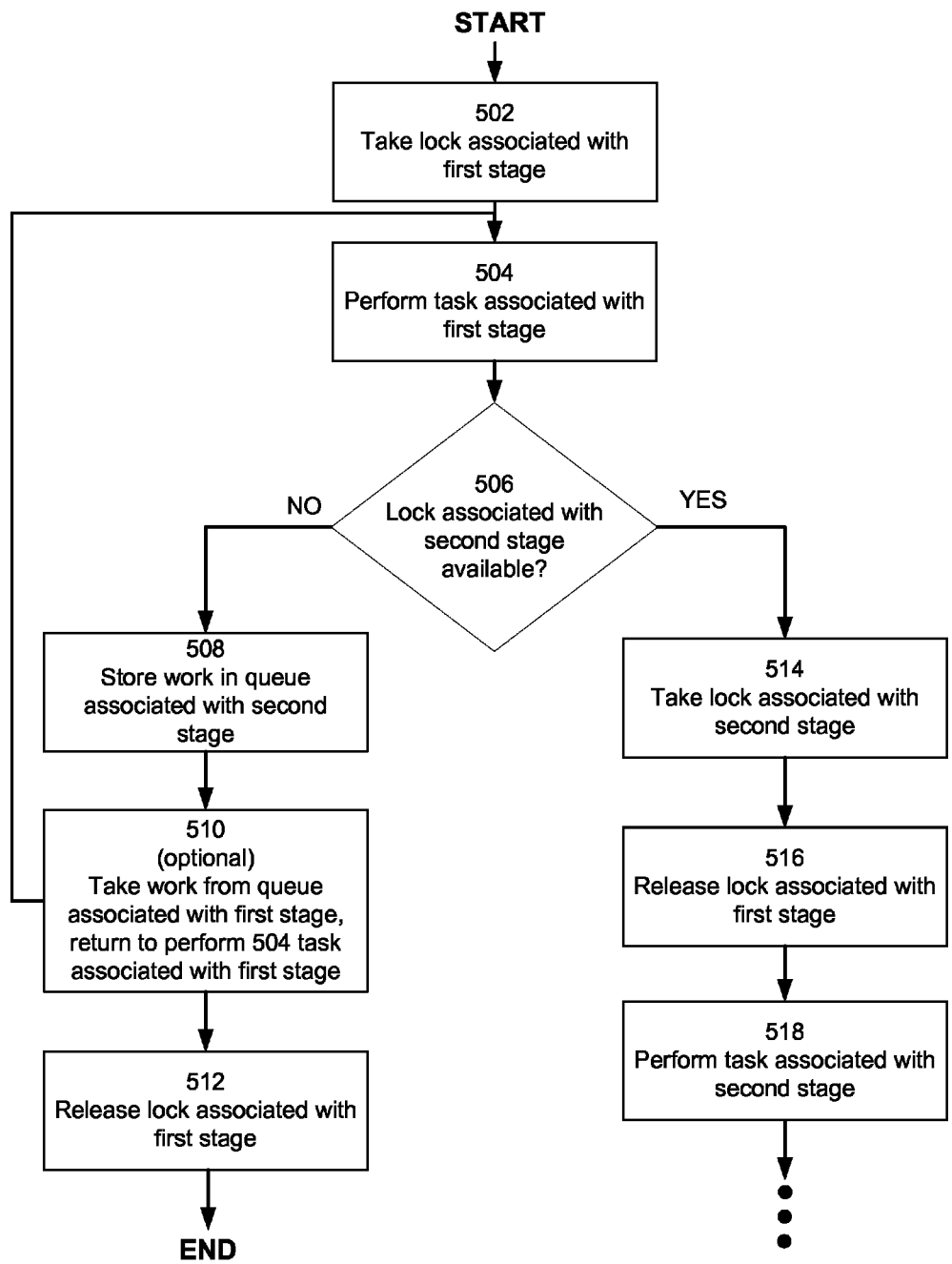
FIG. 5(a) shows a flow chart of a method for traversing a linear chain of processing stages in accordance with one or more embodiments of the present invention.

FIG. 5(a) shows a flow chart of a method for traversing a linear chain of processing stages in accordance with one or more embodiments of the present invention. In accordance with one or more such embodiments, the method is carried out by a thread of execution which is associated with some particular pieces of work for which it is desired to maintain processing order. The pieces of work associated with a thread of execution are said to be "assigned" to that thread of execution. For example, the pieces of work could be packets, frames of video, samples of a signal, sequences of genes, and so on. Other examples of work for which it may be beneficial to maintain processing order will be apparent to one of ordinary skill in the art without departing from the scope of the present invention.

As shown in FIG. 5(a), at step 502, the thread of execution takes a lock associated with a first processing stage—taking the lock associated with the first processing stage prevents other threads of execution from entering the first processing stage.

Figure 6:
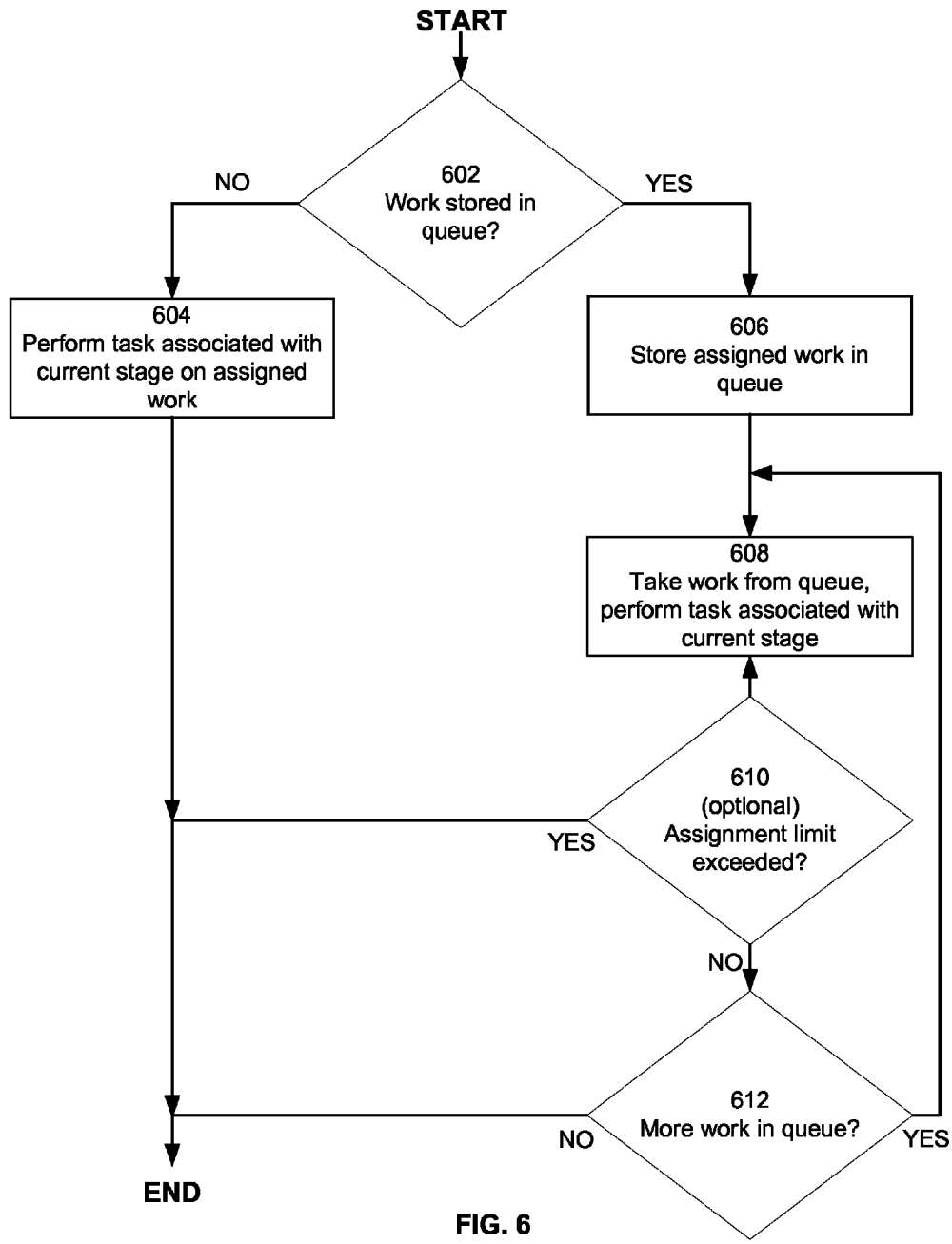
FIG. 6 shows a flowchart of a method for performing a task associated with a particular processing stage in accordance with one or more embodiments of the present invention.

At step 504, the thread of execution performs a task associated with the first processing stage (a method for performing a task associated with a particular processing stage in accordance with one or more embodiments of the present invention is described herein in conjunction with FIG. 6). In accordance with one or more embodiments of the present invention, performing the task associated with the first processing stage can include, for example and without limitation, performing the task for one or more pieces of work stored in a queue associated with the processing first stage, and/or performing the task for one or more pieces of work associated with the thread of execution.

At decision step 506, the thread of execution determines if a lock associated with a second processing stage is available.

If the thread of execution determines that a lock associated with the second processing stage is available, control is transferred to step 514, otherwise control is transferred to step 508.

At step 514, the thread of execution takes a lock associated with the second processing stage. In accordance with one or more embodiments, decision step 506 of determining if a lock is available, and step 514 of taking the lock may be combined into a single step. For example and without limitation, in accordance with one or more embodiments, at decision step 506, a thread of execution attempts to take a lock, and determines if the lock is available based on whether the attempt to take the lock was successful.

At step 516, the thread of execution releases the lock associated with the first processing stage—releasing the lock associated with the first processing stage allows another thread of execution to enter the first processing stage.

At step 518, the thread of execution performs a task associated with the second processing stage (a method for performing a task associated with a particular processing stage in accordance with one or more embodiments of the present invention is described herein in conjunction with FIG. 6). Thus, the thread of execution has successfully traversed from a first processing stage to a second processing stage. In accordance with one or more embodiments, when a thread of execution reaches the last processing stage in a chain, processing work assigned to the thread of execution is complete, and the thread of execution is available for processing new work.

At step 508, the thread of execution stores its work in a queue associated with the second processing stage. In accordance with one or more embodiments of the present invention, a piece of work stored in a queue of a processing stage is no longer the responsibility of the thread of execution, and the piece of work is disassociated from the thread of execution. Storing a piece of work in the queue associated with the second processing stage enables the thread of execution to avoid stalling while the lock associated with the second processing stage is unavailable. Rather, the thread of execution can perform other useful processing. Such work is available in the queue for a different thread of execution to take, and become responsible for, as described herein in conjunction with FIG. 6.

At optional step 510, in accordance with one or more embodiments, the thread of execution takes a piece of work from the queue associated with the first processing stage, and returns to step 504 to perform the task associated with the first stage. The piece of work could be stored in the queue associated with the first processing stage, for example, because another thread of execution was unable to take the lock associated with the first processing stage. Because the thread of execution is locked out of going forward to the second processing stage, and already holds the lock on the first processing stage (it has not yet released it), the thread of execution can usefully perform the task associated with the first processing stage on an additional piece of work from the queue associated with the first stage. If the lock that is associated with the second processing stage becomes available at the completion of the task associated with the first stage on the additional piece of work, the thread of execution can proceed to step 514 to take the lock associated with the second processing stage. However, if the lock associated with the second stage is still not available, the thread of execution can continue the cycle until either the lock associated with the second processing stage becomes available or no more work is available in the queue associated with the first processing stage.

In accordance with one or more embodiments, a limit may be placed on the number of pieces of work a thread of execution can perform in a given processing stage. For example and without limitation, because the thread of execution is holding the lock associated with the first processing stage while continuing to perform the task associated with the first processing stage, at step 510, it may be useful at some point for the thread of execution to stop taking additional pieces of work from the queue associated with the first processing stage, and release the lock associated with the first processing stage. In accordance with one or more such embodiments, at step 510, the thread of execution continues the cycle of taking an additional piece of work and performing the task associated with the first processing stage at step 504 until the lock associated with the second processing stage becomes available, no more work is available in the queue associated with the first processing stage, or until a limit on the amount of time spent or number of tasks performed by the thread of execution in the first processing stage is reached.

At step 512, the thread of execution releases the lock associated with the first processing stage. Releasing the lock associated with the first processing stage allows another thread of execution to enter the first processing stage. The thread of execution is finished, and can be assigned to another processing assignment.

Figure 5B:
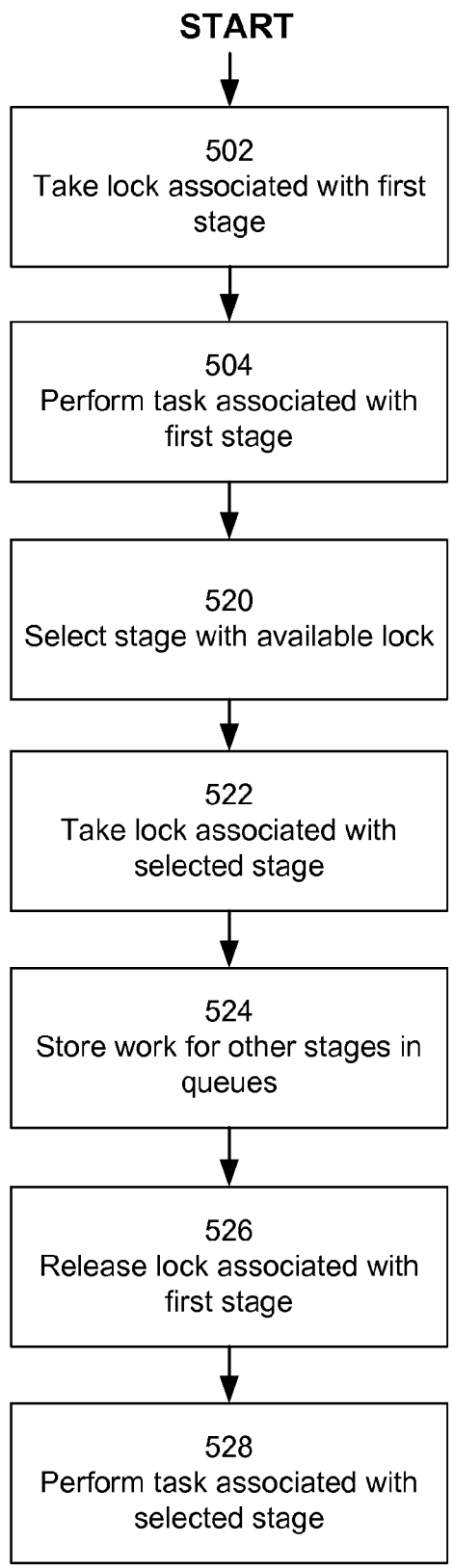
FIG. 5(b) shows a flow chart of a method for traversing a branching chain of processing stages in accordance with one or more embodiments of the present invention.

FIG. 5(b) shows a flow chart of a method for traversing a branching chain of processing stages in accordance with one or more embodiments of the present invention. In accordance with one or more embodiments, the method is carried out by a thread of execution which is associated with some particular pieces of work for which it is desired to maintain processing order. The pieces of work associated with a thread of execution are said to be "assigned" to that thread of execution.

As shown in FIG. 5(b), at step 502, the thread of execution takes a lock associated with a first processing stage.

At step 504, the thread of execution performs a task associated with the first processing stage.

At step 520, the thread of execution selects a processing stage with an available lock. In accordance with one or more further embodiments, the thread of execution selects a plurality of processing stages with available locks. The thread of execution can select a processing stage with an available lock using a variety of methods. As described herein in conjunction with FIG. 4(b), a plurality of stages can be associated with tasks appropriate for the pieces of work assigned to the thread of execution. For example and without limitation, the thread of execution can attempt to take a lock on a subsequent processing stage associated with a task that is appropriate for the thread of execution's collection of pieces of work in a round robin fashion until an available lock is found. As another example and without limitation, the thread of execution can attempt to take a lock on a subsequent stage associated with a task that is appropriate for the largest amount of work associated with the thread of execution. If that lock is not available, the thread of execution can attempt to take a lock on the subsequent processing stage associated with a task that is appropriate for the second largest amount of work associated with the thread of execution. These examples have been given for the purposes of illustration and are not limiting. Other techniques for selecting a processing stage with an available lock will be apparent to one of ordinary skill in the art without departing from the scope of the present invention.

At step 522, the thread of execution takes the lock associated with the selected processing stage. According to one or more embodiments of the present invention, the thread of execution takes a plurality of locks associated with the selected processing stages. In accordance with one or more embodiments, step 520 of selecting a processing stage with an available lock and step 522 of taking the lock associated with the selected processing stage are combined into a single step. For example and without limitation, at step 520, a thread of execution selects a stage, and at step 522, attempts to take a lock, and determines if the lock is available based on whether the attempt to take the lock was successful. If the attempt to take the lock was not successful, the thread of execution returns to step 520 to select another processing stage. If no lock is available, the thread of execution stores its work in appropriate queues, and releases the lock associated with the first processing stage, as described herein in conjunction with FIG. 5(*a*) and steps 508 and 512 thereof.

At step 524, the thread of execution stores work for other processing stages in queues associated with those processing stages. For example and without limitation, the task associated with the selected processing stage may not be appropriate for some pieces of work associated with the thread of execution. Such work is stored in queues of processing stages associated with tasks appropriate for such work. In accordance with one or more embodiments of the present invention, a piece of work stored in a queue of a processing stage is no longer the responsibility of the thread of execution, and the piece of work is disassociated from the thread of execution. Such work is available in the queue for a different thread of execution to take, and become responsible for, as described herein in conjunction with FIG. 6. Storing a piece of work for other processing stages on queues associated with those processing stages maintains processing order while the thread of execution can perform other useful processing.

At step 526, the thread of execution releases the lock on the first processing stage—releasing the lock on the first processing stage enables other threads of execution to enter the first processing stage.

At step 528, the thread of execution performs a task associated with the selected processing stage on work associated with the thread of execution. In accordance with one or more embodiments, the thread of execution takes a piece of work as far down the chain of processing stages as possible. By taking a piece of work as far down the chain of processing stages as possible, a thread of execution frequently avoids handing-off work to another thread of execution, thereby keeping processing overhead low.

In accordance with one or more embodiments, after the thread of execution cannot proceed any further down the chain of processing stages (for example, when the end of the chain of processing stages is reached, or when no lock is available), the thread of execution returns to step 520 of selecting a different processing stage with an available lock, and work stored in its queue. Returning to select a different processing stage with an available lock provides additional assurance that any work stored in the queues of other processing stages will ultimately be taken and the appropriate tasks will be performed.

FIG. 6 shows a flow chart of a method for performing a task associated with a particular stage in accordance with one or more embodiments of the present invention. In accordance with one or more such embodiments, the method is carried out by a thread of execution which is associated with some particular pieces of work for which it is desired to maintain processing order. The pieces of work associated with a thread of execution are said to be "assigned" to that particular thread of execution. In accordance with one or more such embodiments, a thread of execution that carries out the embodiment of method shown in FIG. 6 holds a lock associated with a processing stage—the processing stage associated with the lock held by the thread of execution is referred to as the "current processing stage".

At decision step 602, the thread of execution determines if work is stored in a queue associated with the current processing stage. In accordance with one or more embodiments, a piece of work stored in the queue associated with the current processing stage is presumed to be ahead, in processing order, of a piece of work assigned to the thread of execution. Therefore, the thread of execution determines if work is stored in the queue associated with the current processing stage before executing step 604 of performing the task associated with the current processing stage on its assigned work. If the thread of execution determines that no work is stored in the queue associated with the current processing stage, at step 604, the thread of execution performs the task associated with the current processing stage on its assigned work. After that, at step 604, because no work was stored in the queue associated with the current processing stage, the thread of execution is finished performing the task associated with the current processing stage.

If the thread of execution determines that work is stored in the queue associated with the current processing stage at decision step 602, then, at step 606, the thread of execution stores its assigned work in the queue. Because the queue is typically implemented as a first-in first-out (FIFO) structure, work previously stored in the queue will be taken from the queue before the work stored by the thread of execution.

In accordance with one or more embodiments of the present invention, work stored in the queue associated with the current processing stage is no longer considered the responsibility of the thread of execution. Thus, in accordance with one or more embodiments of the present invention, a step of storing work assigned to the thread of execution can include, for example, disassociating the thread of execution from the work. In accordance with one or more embodiments, after the thread of execution stores its assigned work in the queue, the thread of execution momentarily has no work assigned to it.

In accordance with one or more embodiments, the thread of execution takes a lock in associated with the current processing stage before taking a lock associated with the queue itself. Taking a lock associated with the queue ensures that other threads of execution will not store work in the queue before the thread of execution can determine if work is stored in the queue and/or store its assigned work in the queue, thereby maintaining processing order. After the thread of execution has determined, at decision step 602, that no work is stored in the queue, or after the thread of execution has stored its assigned work in the queue, at step 606, the thread of execution can release the lock associated with the queue.

At step 608, the thread of execution takes work from the queue associated with the current processing stage, and performs the task associated with the current processing stage on that work (now considered its assigned work, since taking work from a queue makes that work the responsibility of the thread of execution). In accordance with one or more embodiments, taking work from the queue associated with the current processing stage comprises associating that work with the thread of execution. Thus, after taking work from the queue, the thread of execution may be associated with the same work that it entered the current processing stage with, different work than it entered the current stage with, or possibly some of both.

In accordance with one or more embodiments, at optional decision step 610, the thread of execution determines if an assignment limit has been exceeded. For example and without limitation, in some cases it may be useful to limit the amount of work that can be associated with a thread of execution at a given time. Such a limit is useful, for example, to prevent bottlenecks or other slowdowns in a chain of processing stages. If the thread of execution determines that the assignment limit has been exceeded, the thread of execution is done carrying out the task associated with the current processing stage, despite the fact that there may be more work in the queue associated with the current processing stage.

At decision step 612, if the thread of execution determines that the assignment limit has not been exceeded, the thread of execution determines if more work is present in the queue associated with the current processing stage. If the thread of execution determines that no more work is present in the queue associated with the current processing stage, the thread of execution is done performing the task associated with the current processing stage. If the thread of execution determines that more work is present in the queue associated with the current stage, the thread of execution returns to step 608 to take work from the queue. More work could be present in the queue, for example, because of a difference in the amount of work stored by the thread of execution at step 606 and the amount of work taken from the queue at step 608, the amount of work present in the queue when the thread of execution entered the current processing stage, or the addition of work to the queue by another thread of execution while the thread of execution holds the lock on the current processing stage.

When the thread of execution has finished performing the task associated with the current processing stage (for example, because no work is stored in the queue, or because the assignment limit has been exceeded), the thread of execution proceeds to the next processing stage in the chain of processing stages as described herein in conjunction with FIGS. 5(*a*) and 5(*b*). In some cases, it is possible that the thread of execution is associated with different work when it leaves the processing stage than it was when it entered the current processing stage. In practice, the assignment of work to a thread of execution may change as work is dropped off at locked out processing stages, and picked up by various other threads of execution.

Thus, according to various embodiments of the present invention, processing order is maintained while taking advantage of parallel processing capabilities of a computer system. Furthermore, pieces of work and tasks are organized such that task-ordered parallel processing can be achieved with low overhead and small latency.

The following describes how the above-described embodiments of the present invention may be used to solve the problem faced in the above-described example. In accordance with one or more embodiments of the present invention, as was described above, work is organized into a pipeline of processing stages wherein each processing stage has its own lock so that different threads of execution can be in different processing stages concurrently, but only at most one thread of execution can be in each processing stage. Thus, in accordance with one or more embodiments, a thread of execution starts at the head of the pipeline where it picks up work— in the case of the networking example; it picks up packets from a sending VNIC. When the thread of execution completes the work at one processing stage (for example, Stage-I), it attempts to proceed to the next processing stage by trying to acquire the lock for the next processing stage (i.e., Stage-I+1). The thread of execution makes the lock-acquisition attempt without relinquishing the lock of the processing stage it is in (i.e., Stage-I). If the lock-acquisition succeeds, it then relinquishes the lock of the current processing stage (i.e., the lock of Stage-I), and brings its work into that processing stage. However, If the lock-acquisition fails, the thread of execution enqueues the pending work (packets in this example) into a pending work (for example, first-in-first-out) queue associated with Stage-I+1 before releasing the lock of Stage-I. Then, in accordance with one or more embodiments of the present invention, the pending work will be picked up by another thread of execution later. In the mean time, this thread of execution—or rather, the CPU running this thread of execution—can go do other work.

In accordance with one or more embodiments of the present invention, work that has been queued up in a pending work queue can be picked up in several ways. One way pending work is picked up is when a thread of execution successfully acquires the lock for a stage (for example, Stage-J). The thread of execution checks Stage-J's pending work queue, and it processes those pieces of pending work through Stage-J before it processes additional work it brought along to preserve ordering. This method for picking up pending work is adequate for a case where threads constantly enter the pipeline. In accordance with one or more embodiments of the present invention, this may be ensured (i.e., that a thread of execution constantly enters the pipeline) by scheduling such a thread periodically. This can be done, for example and without limitation, using a periodic timeout service provided by most operating systems. In accordance with one or more further embodiments of the present invention, work queued in a pending work queue is picked up by having a thread that has finished working on a pipeline check the pending work queue for the processing stage it is in. In one such case, the thread has gone all the way to the end of the pipeline, and in another case, the thread is in the middle of the pipeline, say Stage-k, but fails to acquire the lock for the next stage (i.e., Stage-k+1). As a result, the thread queues up the work it was going to push into Stage-k+1 on that stage's pending work queue. In both cases, without relinquishing the lock on the stage it is in, the thread checks that stage's pending work queue. If work is queued therein, the thread picks that work up, and pushes that work through that processing stage, and it will attempt to push the work through subsequent processing stages as well. As one can readily appreciate from the above, this will have the dynamic behavior that, as much as possible, a thread of execution will carry the work it picks up as far down the pipeline as it can (it typically picks work up from the head of the pipeline, but it may also pick work up from any processing stage in the pipeline). Thus, this method: (a) achieves parallelism by permitting multiple threads of execution to traverse the pipeline concurrently; (b) it maintains relative ordering as work goes through the pipeline; and (c) a processor that is blocked does not waste time waiting for the next processing stage to be unlocked, instead, it is deployed to do other work.

In accordance with one or more further embodiments of the present invention, when a thread in processing stage Stage-k successfully locks Stage-k+1, instead of going into Stage-k+1 with the work it has at hand, it does the following instead. It checks the pending work queue of Stage-k+1 (this is needed to maintain ordering in case there is pending work in the queue) while it is holding locks of Stage-k and Stage-k+1. If there is no work queued in the pending work queue of Stage-k+1, the thread goes back to Stage-k to check its pending work queue. If work is in that queue, the thread picks up that work, process them through Stage-k, and then pushes its original pending work, plus the new work through Stage-k+1. This method may have slightly worse latency characteristics than others because it may end up collecting a lot of work over a number of iterations of re-acquiring work from Stage-k's pending queue before proceeding into Stage-k+1. In many situations, it is desirable to keep the amount of work picked up by each thread roughly the same. In that way, multiple threads can be passing through the processing stage, one behind the other in a loosely lock-step fashion. In accordance with one or more still further embodiments, the amount of work (for example, number of packets) pushed through the pipeline may be limited by limiting the number of times a thread re-acquires work from Stage-k's pending queue. In accordance with one or more still further embodiments, excess work may be deposited in a pending work queue of a processing stage to achieve a desired amount of work that is being pushed by one thread through the pipeline at any one traversal of the pipeline.

Thus, using the networking example above, one or more embodiments of the present invention may use the following processing stages which dynamically form multiple overlapping pipelines. Let each VNIC be divided into two (2) parts, a transmit (Tx) part and a receive (Rx) part, where each part corresponds to a separate processing stage. Further, let virtual switch 601 have multiple independent processing stages, one for each port to which a VNIC Tx part connects. Then, in this networking example, pipelines are dynamically determined. For example, in accordance with one or more embodiments of the present invention, a pipeline starts at a VNIC Tx processing stage, it then goes to a corresponding switching processing stage of virtual switch 601 (the switching processing stage makes a switching decision for each packet to choose an appropriate destination VNIC Rx processing stage), and finally, it goes to a destination VNIC Rx processing stage. As one can readily appreciate from this, each dynamically determined pipeline has three (3) processing stages, and multiple pipelines (for example, pipelines starting from VNIC Tx processing stages of different VNICs) can be in virtual switch 601 concurrently. The third processing stage is dynamically switched as packets that enter the switching processing stage together may be switched thereby to different destination VNIC Rx processing stages. In accordance with one or more embodiments of the present invention, the switching processing stage may be embodied in a number of ways. For example, in accordance with one or more such embodiments, the lock of the switching processing stage is not released while pipelines going from a VNIC Tx processing stage to any one of a number of different VNIC Rx processing stages that are to receive packets from that VNIC Tx are being traversed by threads of execution, and the lock is only released when a thread of execution enters the VNIC Rx processing stage for the last such packet. In other words, the lock is only released after all of the packets have been transferred. In accordance with one or more further embodiments, the switching processing stage uses exit locks, i.e., there is one lock for each (input port, output port) pair of virtual switch 601. Thus, in accordance with one or more such further embodiments, a thread of execution going through the switching processing stage locks the lock of every output port for which it has packets. So, for example, if the switching processing stage is dispatching packets received from input port I1, for every exit port Oi to which it will send a packet, the thread of execution locks the (I1, Oi) lock. Then, when the thread of execution is done locking the (I1, Oi) locks, it releases the switching processing stage lock as it proceeds through the different stages. In essence, these (I1, Oi) locks are the next set of locks in a coupled-locking sequence. The use of these (I1, Oi) locks permits a second thread of execution, working on behalf of input port I1, to proceed to the virtual switch dispatch stage. That second thread of execution can even go further into the third processing stage if it is going to output ports that are not locked by the first thread of execution. In accordance with one or more still further embodiments, packets are put in a pending queue of output ports instead of having the output locks described above. This is done for each output port, except for one that the thread of execution can immediately work on.

Preferably, the thread of execution selects this output port after it has successfully obtained its corresponding lock for the VNIC Rx processing stage. Such embodiments have a benefit that another thread of execution can come along and pick up pending packets, and those output ports are not locked waiting for the current thread of execution.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

One or more embodiments of the present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above.

While the invention has been particularly shown and described with reference to a preferred embodiment and several alternate embodiments, it will be understood by persons skilled in the relevant art that various changes in form and details can be made therein without departing from the spirit and scope of the invention.

Appendix Relating to Virtualized Computer Systems

As is well known in the field of computer science, a virtual machine (VM) is an abstraction—a "virtualization"—of an actual physical computer system. FIG. 1 shows one possible arrangement of computer system 700 that implements virtualization. A virtual machine (VM) or "guest" 200 is installed on a "host platform," or simply "host," which includes system hardware, that is, hardware platform 100, and one or more layers or co-resident components comprising system-level software, such as an operating system or similar kernel, or a virtual machine monitor or hypervisor (see below), or some combination of these. The system hardware typically includes one or more processors 110, memory 130, some form of mass storage 140, and various other devices 170.

Each VM 200 (including VM 200 and additional "n" number of VMs 200-*n*) will typically have both virtual system hardware 201 and guest system software 202. The virtual system hardware typically includes at least one virtual CPU, virtual memory 230, at least one virtual disk 240, and one or more virtual devices 270. Note that a disk—virtual or physical—is also a "device," but is usually considered separately because of the important role of the disk. All of the virtual hardware components of the VM may be implemented in software using known techniques to emulate the corresponding physical components. The guest system software includes guest operating system (OS) 220 and drivers 224 as needed for the various virtual devices 270.

Note that a single VM may be configured with more than one virtualized processor; FIG. 1 illustrates multiple virtual processors 210-0, 210-1, ..., 210-m (VCPU0, VCPU1, ..., VCPUm) within VM 200. For example, symmetric multi-processor (SMP) systems exist wherein a hardware platform wherein multiple processors are connected to a shared main memory and shared I/O devices—VMs may configured as SMP VMs. In addition, multi-processor systems exist in a so-called "multi-core" architecture) wherein more than one physical CPU is fabricated on a single chip and having its own set of functional units (such as a floating-point unit and an arithmetic/logic unit ALU), and where threads can be executed independently; multi-core processors typically share limited resources, such as some cache—VMs may be configured as multi-core systems. In addition, simultaneous execution of multiple threads in which more than one logical CPU operates simultaneously on a single chip, but in which the logical CPUs flexibly share one or more resources such as caches, buffers, functional units, etc. One or more embodiments of the present invention may be used regardless of the type—physical and/or logical—or number of processors included in a VM.

As is well known, "virtualization software" interfaces between guest software within a VM and various hardware components and devices in the underlying hardware platform. The virtualization software may include one or more software components and/or layers, possibly including one or more of the software components known in the field of virtual machine technology as "virtual machine monitors" (VMMs) 300, 300n, "hypervisors," or virtualization "kernels." Because virtualization terminology has evolved over time and has not yet become fully standardized, these terms do not always provide clear distinctions between the software layers and components to which they refer. For example, the term "hypervisor" is often used to describe both a VMM and a kernel together, either as separate but cooperating components or with one or more VMMs (300-300n) incorporated wholly or partially into the kernel itself; however, the term "hypervisor" is sometimes used instead to mean some variant of a VMM alone, which interfaces with some other software layer(s) or component(s) to support virtualization. Moreover, in some systems, some virtualization code is included in at least one "superior" VM to facilitate the operations of other VMs. Furthermore, specific software support for VMs may be included in the host OS itself. Unless otherwise indicated, one or more embodiments of the present invention may be used in virtualized computer systems having any type or configuration of virtualization software.

FIG. 1 shows VMMs that appear as separate entities from other components of virtualization software. Furthermore, some software components used to implemented one illustrated embodiment of the present invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. Again, unless otherwise indicated or apparent from the description below, it is to be assumed that one or more embodiments of the present invention can be implemented anywhere within the overall structure of the virtualization software, and even in systems that provide specific hardware support for virtualization.

Various virtualized hardware components in VM 200, such as the virtual CPU(s), virtual memory 230, virtual disk 240, and virtual device(s) 270, are shown as being part of VM 200 for the sake of conceptual simplicity. In accordance with or more embodiments of the present invention, one or more of these virtualized hardware components are implemented as software emulations 370 included in VMM 300.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration (which is shown in FIG. 2) and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM. As shown in FIG. 2, host OS 450, which usually includes drivers 454 and supports applications 460 of its own, and VMM 300 are both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

In addition to device emulators 370, FIG. 2 also illustrates some of the other components that are also often included in the VMM 300 of a hosted virtualization system; many of these components are found in the VMM 300 of a non-hosted system as well. For example, interrupt/exception handlers 330 (int/expt 330) may be included to help context-switching, and direct execution engine 310 and binary translator 320 with associated translation cache 325 may be included to provide execution speed while still preventing the VM from directly executing certain privileged instructions.

As illustrated in FIG. 1, in many cases, it may be beneficial to deploy VMMs on top of a software layer—kernel 600—constructed specifically to provide efficient support for the VMs. This configuration is frequently referred to as being "non-hosted." Compared with a system in which VMMs run directly on the hardware platform, use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. Kernel 600 also handles any other applications running on it that can be separately scheduled, as well as a console operating system that, in some architectures, is used to boot the system and facilitate certain user interactions with the virtualization software.

Note that kernel 600 is not the same as the kernel that will be within the guest OS 220. Note also that kernel 600 is part of the "host" platform of the VM/VMM as defined above even though the configuration shown in FIG. 1 is commonly termed "non-hosted;" moreover, the kernel may be both part of the host and part of the virtualization software or "hypervisor." The difference in terminology is one of perspective and definitions that are still evolving in the art of virtualization.

What is claimed is:

1. A method for processing pieces of work in a plurality of stages, the method comprising:
   taking a lock associated with a first stage;
   performing a task associated with the first stage on a first piece of work;
   determining if a lock associated with a second stage is available; and
   if the lock associated with the second stage is not available, storing the first piece of work in a queue associated with the second stage and taking a second piece of work from a queue associated with the first stage and performing the task associated with the first stage on the second piece of work.

2. The method of claim 1, wherein determining if the lock associated with the second stage is available comprises:
   attempting to take the lock associated with the second stage; and
   determining if the attempt to take the lock associated with the second stage was successful.

3. The method of claim 1, further comprising:
   if the lock associated with the second stage is available, taking a second piece of work from the queue associated with the second stage and performing the task associated with the second stage on the second piece of work.

4. The method of claim 3, further comprising:
   taking a lock associated with a third stage;
   performing a task associated with the third stage on the second piece of work; and
   performing the task associated with the third stage on the first piece of work.

5. The method of claim 1, further comprising:
   taking the lock associated with the second stage;
   performing the task associated with the second stage on the first piece of work; and
   performing the task associated with the second stage on the second piece of work.

6. The method of claim 1, further comprising determining if the queue associated with the second stage contains a second piece of work.

7. The method of claim 1, further comprising performing the task associated with the first stage on a second piece of work.

8. The method of claim 7, further comprising if the lock associated with the second stage is available, storing the second piece of work in a queue associated with a third stage.

9. The method of claim 7, further comprising if the lock associated with the second stage is not available, taking a lock associated with a third stage and performing a task associated with the third stage on the second piece of work.

10. A method for processing packets in a virtual switch connected to a plurality of virtual machines, the method comprising:
    taking a lock associated with a first stage;
    performing a task associated with the first stage on a first packet;
    determining if a lock associated with a second stage is available; and
    if the lock associated with the second stage is not available, storing the packet in a queue associated with the second stage and taking a second packet from a queue associated with the first stage and performing the task associated with the first stage on the second packet.

11. The method of claim 10, further comprising:
    if the lock associated with the second stage is available, taking a second packet from the queue associated with the second stage; and
    performing the task associated with the second stage on the second packet.

12. The method of claim 11, further comprising:
    taking a lock associated with a third stage;
    performing a task associated with the third stage on the second packet; and
    performing the task associated with the third stage on the first packet.

13. The method of claim 10, further comprising:
    taking the lock associated with the second stage;
    performing the task associated with the second stage on the first packet; and
    performing the task associated with the second stage on the second packet.

14. The method of claim 10, further comprising performing the task associated with the first stage on a second packet.

15. The method of claim 14, further comprising if the lock associated with the second stage is available, storing the second packet in a queue associated with a third stage.

16. The method of claim 14, further comprising if the lock associated with the second stage is not available, taking a lock associated with a third stage and performing a task associated with the third stage on the second packet.

17. The method of claim 10, wherein performing the task associated with the first stage comprises checking the first packet for errors.

18. The method of claim 10, wherein performing the task associated with the first stage comprises identifying a destination address of the first packet.

19. The method of claim 10, wherein performing the task associated with the first stage comprises determining a virtual switch port for transmission of the first packet.

20. The method of claim 10, wherein performing the task associated with the second stage comprises delivering the first packet to a virtual machine monitor.

21. A method for processing pieces of work in a plurality of stages, the method comprising:
   taking a first lock associated with a first stage;
   performing a task associated with the first stage on a first piece of work;
   taking a second lock associated with the first stage;
   releasing the first lock associated with the first stage;
   determining if a lock associated with a second stage is available;
   if the lock associated with the second stage is available, taking the lock associated with the second stage, releasing the second lock associated with the first stage, and performing a task associated with the second stage on the first piece of work; and
   if the lock associated with the second stage is not available, storing the first piece of work in a queue associated with the second stage and releasing the second lock associated with the first stage.

22. A system for maintaining processing order while permitting parallelism, the system comprising:
   a first queue associated with a first stage;
   a first lock associated with the first stage;
   a second lock associated with a second stage;
   a first thread of execution assigned to a first piece of work, wherein the first thread of execution is configured to:
      take the first lock;
      perform a first task associated with the first stage on the first piece of work;
      determine if the second lock is available;
      if the second lock is available, take the second lock and perform a second task on the first piece of work; and
      if the second lock is not available, store the first piece of work in the first queue; and
   a second thread of execution assigned to a second piece of work, wherein the second thread of execution is configured to:
      take the first lock;
      perform the first task on the second piece of work;
      determine if the second lock is available;
      if the second lock is available, take the second lock and perform the second task on the second piece of work; and
      if the second lock is not available, store the second piece of work in the first queue.

23. A non-transitory computer-readable storage medium comprising computer-readable instructions for processing pieces of work in a plurality of stages, the computer-readable storage medium causing one or more processors to perform the steps of:
   taking a lock associated with a first stage;
   performing a task associated with the first stage on a first piece of work;
   determining if a lock associated with a second stage is available; and
   if the lock associated with the second stage is not available, storing the first piece of work in a queue associated with the second stage and taking a second piece of work from a queue associated with the first stage and performing the task associated with the first stage on the second piece of work.

24. The non-transitory computer-readable storage medium of claim 23, wherein determining if the lock associated with the second stage is available comprises:
   attempting to take the lock associated with the second stage; and
   determining if the attempt to take the lock associated with the second stage was successful.

25. The non-transitory computer-readable storage medium of claim 23, wherein the computer-readable storage medium further causes the one or more processors to perform the steps of:
   if the lock associated with the second stage is available, taking a second piece of work from the queue associated with the second stage; and
   performing the task associated with the second stage on the second piece of work.

26. The non-transitory computer-readable storage medium of claim 25, wherein the computer-readable storage medium further causes the one or more processors to perform the steps of:
   taking a lock associated with a third stage;
   performing a task associated with the third stage on the second piece of work; and
   performing the task associated with the third stage on the first piece of work.

27. The non-transitory computer-readable storage medium of claim 23, wherein the computer-readable storage medium further causes the one or more processors to perform the steps of:
   taking the lock associated with the second stage; performing the task associated with the second stage on the first piece of work; and
   performing the task associated with the second stage on the second piece of work.

28. The non-transitory computer-readable storage medium of claim 23, wherein the computer-readable storage medium further causes the one or more processors to perform the step of determining if the queue associated with the second stage contains a second piece of work.

29. The non-transitory computer-readable storage medium of claim 23, wherein the computer-readable storage medium further causes the one or more processors to perform the step of performing the task associated with the first stage on a second piece of work.

30. The non-transitory computer-readable storage medium of claim 29, wherein the computer-readable medium further causes the one or more processors to perform the step of storing the second piece of work in a queue associated with a third stage if the lock associated with the second stage is available.

31. The non-transitory computer-readable storage medium of claim 29, wherein the computer-readable storage medium further causes the one or more processors to perform the steps of:
   if the lock associated with the second stage is not available, taking a lock associated with a third stage; and
   performing a task associated with the third stage on the second piece of work.

32. A non-transitory computer-readable storage medium comprising computer-readable instructions for processing packets in a virtual switch connected to a plurality of virtual machines, the computer-readable storage medium causing one or more processors to perform the steps of:
   taking a lock associated with a first stage;

performing a task associated with the first stage on a first packet;
determining if a lock associated with a second stage is available;
if the lock associated with the second stage is available, taking the lock associated with the second stage, releasing the lock associated with the first stage, and performing a task associated with the second stage on the first packet; and
if the lock associated with the second stage is not available, storing the packet in a queue associated with the second stage and taking a second packet from a queue associated with the first stage and performing the task associated with the first stage on the second packet.

33. The non-transitory computer-readable storage medium of claim 32, wherein the computer-readable storage medium further causes the one or more processors to perform the steps of:
taking a second packet from the queue associated with the second stage if the lock associated with the second stage is available; and
performing the task associated with the second stage on the second packet.

34. The non-transitory computer-readable storage medium of claim 33, wherein the computer-readable storage medium further causes the one or more processors to perform the steps of:
taking a lock associated with a third stage;
performing a task associated with the third stage on the second packet; and
performing the task associated with the third stage on the first packet.

35. The non-transitory computer-readable storage medium of claim 32, wherein the computer-readable storage medium further causes the one or more processors to perform the steps of:
taking the lock associated with the second stage;
performing the task associated with the second stage on the first packet; and
performing the task associated with the second stage on the second packet.

36. The non-transitory computer-readable storage medium of claim 32, wherein the computer-readable storage medium further causes the one or more processors to perform the step of performing the task associated with the first stage on a second packet.

37. The non-transitory computer-readable storage medium of claim 36, wherein the computer-readable storage medium further causes the one or more processors to perform the step of storing the second packet in a queue associated with a third stage if the lock associated with the second stage is available.

38. The non-transitory computer-readable storage medium of claim 36, wherein the computer-readable storage medium further causes the one or more processors to perform the step of taking a lock associated with a third stage and performing a task associated with the third stage on the second packet if the lock associated with the second stage is not available.

39. The non-transitory computer-readable storage medium of claim 32, wherein performing the task associated with the first stage comprises checking the first packet for errors.

40. The non-transitory computer-readable storage medium of claim 32, wherein performing the task associated with the first stage comprises identifying a destination address of the first packet.

41. The non-transitory computer-readable storage medium of claim 32, wherein performing the task associated with the first stage comprises determining a virtual switch port for transmission of the first packet.

42. The non-transitory computer-readable storage medium of claim 32, wherein performing the task associated with the second stage comprises delivering the first packet to a virtual machine monitor.

43. A non-transitory computer-readable storage medium for processing pieces of work in a plurality of stages, the computer-readable storage medium causing one or more processors to perform the steps of:
taking a first lock associated with a first stage;
performing a task associated with the first stage on a first piece of work;
taking a second lock associated with the first stage;
releasing the first lock associated with the first stage;
determining if a lock associated with a second stage is available;
if the lock associated with the second stage is available, taking the lock associated with the second stage, releasing the second lock associated with the first stage, and performing a task associated with the second stage on the first piece of work; and
if the lock associated with the second stage is not available, storing the first piece of work in a queue associated with the second stage and releasing the second lock associated with the first stage.

44. A method for processing packets in a virtual switch connected to a plurality of virtual machines, the method comprising:
assigning a thread of execution to a first packet;
executing the thread of execution, wherein executing the thread of execution comprises:
taking a lock associated with a first stage;
performing a task associated with the first stage on the first packet;
determining if a lock associated with a second stage is available; and
if the lock associated with the second stage is available:
taking the lock associated with the second stage;
releasing the lock associated with the first stage;
determining if a second packet is in a queue associated with the second stage; and
if a second packet is in the queue associated with the second stage,
performing a task associated with the second stage on the second packet prior to performing the task associated with the second stage on the first packet.

45. The method of claim 44, wherein executing the thread of execution further comprises performing the task associated with the second stage on the first packet after performing the task associated with the second stage on the second packet.

46. The method of claim 45, wherein executing the thread of execution further comprises:
taking a lock associated with a third stage;
performing a task associated with the third stage on the second packet; and
performing the task associated with the third stage on the first packet.

47. A system comprising:
a virtual machine monitor comprising a virtual network interface controller, the virtual network interface controller comprising a first processing stage and a lock for the first processing stage;
a virtual network switch comprising a second processing stage and a lock for the second processing stage; and
at least one processor programmed to:
take the lock for the first processing stage;

perform a task associated with the first processing stage on a piece of work;

determine if the lock for the second stage is available; and if the lock associated with the second stage is not available, store the piece of work in a queue associated with the second stage, take a second packet from a queue associated with the first stage, and perform the task associated with the first stage on the second packet.

48. A system comprising:

a virtual network switch comprising a first processing stage and a lock for the first processing stage;

a virtual machine monitor comprising a virtual network interface controller, the virtual network interface controller comprising a second processing stage and a lock for the second processing stage; and at least one processor programmed to:

take the lock for the first processing stage;

perform a task associated with the first processing stage on a piece of work;

determine if the lock for the second stage is available; and if the lock associated with the second stage is not available, store the piece of work in a queue associated with the second stage, take a second packet from a queue associated with the first stage, and perform the task associated with the first stage on the second packet.

49. A method for maintaining processing order while permitting parallelism, the method comprising:

assigning a first thread of execution to a first piece of work;

executing the first thread of execution, wherein executing the first thread of execution comprises:

taking a first lock associated with a first stage;

performing a first task associated with the first stage on the first piece of work;

determining if a second lock associated with a second stage is available;

if the second lock is available, taking the second lock and perform a second task on the first piece of work; and if the second lock is not available, storing the first piece of work in a first queue associated with the first stage; and assigning a second thread of execution to a second piece of work; and executing the second thread of execution, wherein executing the second thread of execution comprises:

taking the first lock;

performing the first task on the second piece of work;

determining if the second lock is available;

if the second lock is available, taking the second lock and performing the second task on the second piece of work; and if the second lock is not available, storing the second piece of work in the first queue.

* * * * *